US005659695A

United States Patent [19]
Kelley et al.

[11] Patent Number: 5,659,695
[45] Date of Patent: Aug. 19, 1997

[54] METHOD AND APPARATUS UTILIZING SIMULTANEOUS MEMORY READS FOR INCREASING MEMORY ACCESS BANDWIDTH IN A DIGITAL SIGNAL PROCESSOR

[75] Inventors: Brian T. Kelley, Boynton Beach, Fla.; Tan Nhat Dao, Austin, Tex.; Duncan Fisher, Mission Viejo, Calif.

[73] Assignee: Motorola, Inc., Schaumburg, Ill.

[21] Appl. No.: 459,859

[22] Filed: Jun. 2, 1995

[51] Int. Cl.6 .................................................. G06F 12/06
[52] U.S. Cl. ...................... 395/405; 395/411; 395/421.07
[58] Field of Search .................................. 395/401, 410, 395/405, 411, 412, 421.1, 421.06, 421.07

[56] References Cited

U.S. PATENT DOCUMENTS

| | | | |
|---|---|---|---|
| 4,381,541 | 4/1983 | Baumann, Jr. et al. | 395/455 |
| 4,935,867 | 6/1990 | Wang et al. | 395/421.07 |
| 4,964,037 | 10/1990 | Woods et al. | 395/484 |
| 5,008,816 | 4/1991 | Fogg, Jr. et al. | 395/410 |
| 5,276,850 | 1/1994 | Sakaue | 395/412 |
| 5,487,024 | 1/1996 | Girardeau, Jr. | 364/753 |
| 5,537,577 | 7/1996 | Sugimura et al. | 395/484 |
| 5,544,351 | 8/1996 | Lee et al. | 395/550 |
| 5,572,695 | 11/1996 | Andrews et al. | 395/412 |

*Primary Examiner*—Tod R. Swann
*Assistant Examiner*—Keith W. Saunders

[57] ABSTRACT

A method and apparatus for an improving memory access bandwidth that can be used in a digital signal processor (DSP) (500) is accomplished by modifying addresses (302, 304) generated by an address generation unit (AGU) (102) of the DSP (500). Two addresses (302, 304) are generated by the AGU (102). One of the two addresses (302) is used to address two parallel memory blocks (308, 310) in a single memory simultaneously, and the other address (304) is modified by a modulo increment function to produce two additional addresses (404, 406) that also address the parallel memory blocks (308, 310). With such a method and apparatus, four simultaneous memory reads can occur, effectively doubling the memory access bandwidth in the DSP system (500) without modification of the AGU (102) or program controller (510).

7 Claims, 7 Drawing Sheets

FIRST MEMORY BLOCK 108

| ADDRESS | | DATA |
|---|---|---|
| VIRTUAL | PHYSICAL | |
| ⋮ | ⋮ | ⋮ |
| A0 | 50 | S(0) |
| A2 | 51 | S(2) |
| A4 | 52 | S(4) |
| A6 | 53 | S(6) |
| ⋮ | ⋮ | ⋮ |
| C0 | 60 | R(0) |
| C2 | 61 | R(2) |
| C4 | 62 | R(4) |
| C6 | 63 | R(6) |
| ⋮ | ⋮ | ⋮ |

SECOND MEMORY BLOCK 110

| ADDRESS | | DATA |
|---|---|---|
| VIRTUAL | PHYSICAL | |
| ⋮ | ⋮ | ⋮ |
| A1 | 50 | S(1) |
| A3 | 51 | S(3) |
| A5 | 52 | S(5) |
| A7 | 53 | S(7) |
| ⋮ | ⋮ | ⋮ |
| C1 | 60 | R(1) |
| C3 | 61 | R(3) |
| C5 | 62 | R(5) |
| C7 | 63 | R(7) |
| ⋮ | ⋮ | ⋮ |

*FIG.1*

METHOD AND APPARATUS UTILIZING SIMULTANEOUS MEMORY READS FOR INCREASING MEMORY ACCESS BANDWIDTH IN A DIGITAL SIGNAL PROCESSOR

FIELD OF THE INVENTION

This invention relates generally to circuits and in particular to a method and apparatus for improving memory access bandwidth in a digital signal processor.

BACKGROUND OF THE INVENTION

Digital signal processors (DSPs) are commonly used to perform real-time computationally intensive data processing in systems such as modems, digital audio equipment, and digital cellular communications systems. Common features of DSP architectures include an address generation unit (AGU) that implements modulo addressing, program and data memory, a program controller, an arithmetic logic unit (ALU) that implements a multiply-and-accumulate operation, and other application dependent peripheral blocks.

As instruction speeds of DSPs increase, the need to quickly access data in memory for calculations becomes more critical, as the memory accesses must keep pace with the faster instructions. If speed mismatches between instruction execution and slower memory accesses exist, speed improvements in instruction execution will be nullified by the memory access bottleneck.

In microprocessor architectures, average memory access speeds have been improved by providing small cache memories that store a portion of the data in the main memory for faster access. DSPs, however, are data processing intensive and require complex addressing modes that render cache memory solutions unfeasible, as they are unable to support the complex addressing modes and required storage capacity.

Another prior-art technique for increasing the effective speed of memory accesses, or memory access bandwidth, involves accessing parallel memories simultaneously. This technique, however, requires modification of the AGU to support the multiple memories. The modified AGU must be supported by additional control information from the program controller, which further requires modification of the instruction set, redesign of the program controller, etc. These modifications to well-established blocks in a DSP architecture translate into additional design time, reworking of software, and additional die area and cost.

Therefore, a need exists for a method and apparatus for acceleration of the effective speed of memory accesses in a DSP while eliminating the need for modification of existing architectural blocks such as the AGU and program controller.

BRIEF DESCRIPTION OF THE DRAWINGS

FIG. 1 illustrates, in a block diagram, a pair of memory blocks that store data in accordance with the present invention;

DETAILED DESCRIPTION OF THE DRAWINGS

Figure 2:
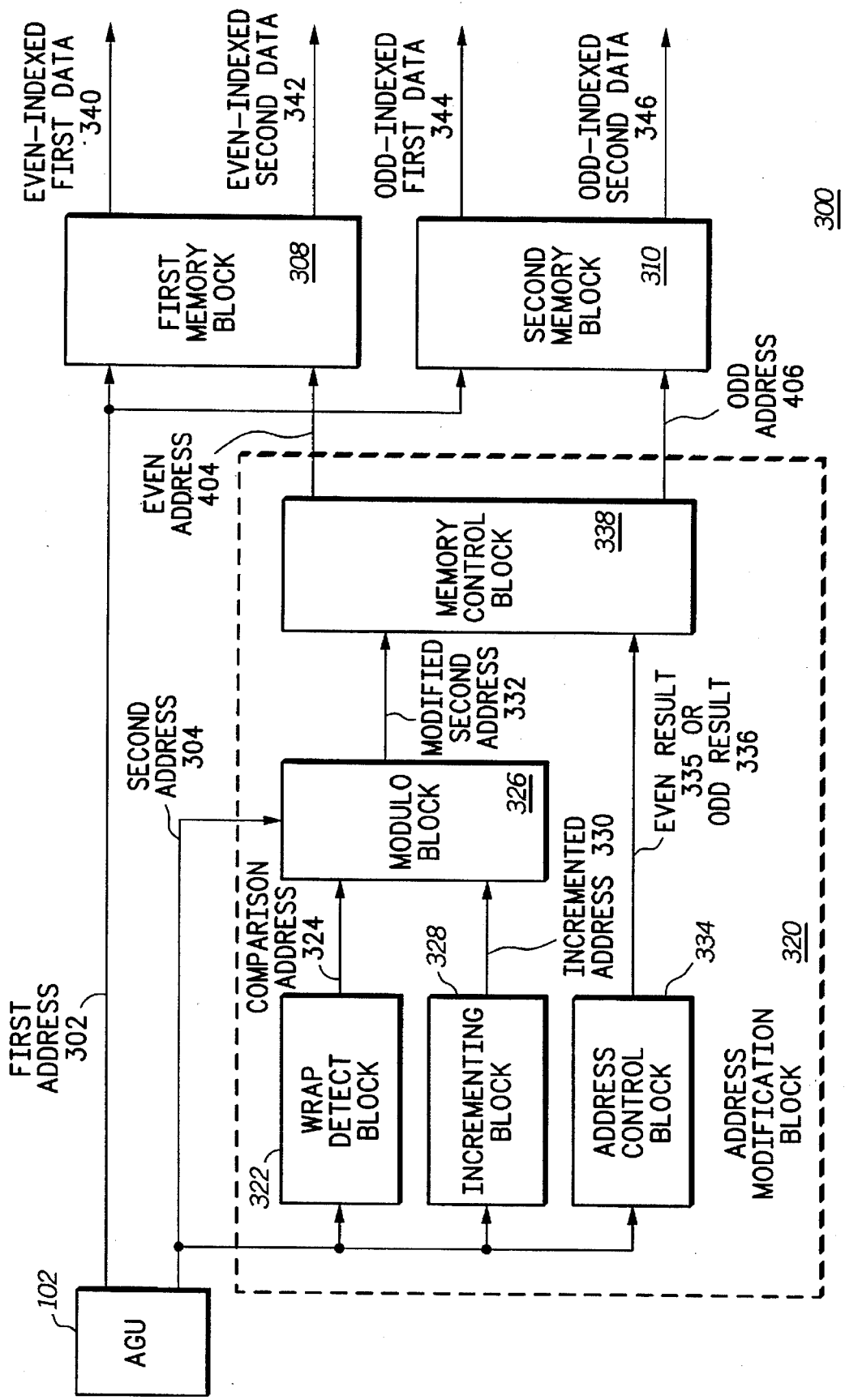
FIG. 2 illustrates, in a block diagram, an apparatus for retrieving data from memory in accordance with the present invention.

Generally, the present invention provides a method and apparatus for address generation that can be used in a digital signal processor (DSP). The method and apparatus are accomplished by modifying addresses generated by an address generation unit (AGU) of the DSP. Two addresses are generated by the AGU. One of the two addresses is used to address two parallel memory blocks in a single memory simultaneously, and the other address is modified by a modulo increment function to produce two additional addresses that address the parallel memory blocks. With such a method and apparatus, four simultaneous memory reads occur, effectively doubling the memory access bandwidth in the DSP system without modification of the AGU or program controller. This allows the memory speed to match the speed of the other blocks in the DSP.

FIG. 1 illustrates data for a correlation/convolution operation stored in a first memory block 108 and a second memory block 110, where the memory blocks 108, 110 may be part of a single memory structure. S(n) represents a first finite-duration sequence which is restricted to an even number of values. R(n) represents a second finite duration sequence that may have the same number of values as S(n) or may be zero-filled to have the same number of values. The values of the sequences are stored sequentially in the two memory blocks as shown. Note that addresses, or virtual addresses, A0 and A1 represent the same physical address within each of the memory blocks. A0 and A1 differ in that A0 has a least significant bit (LSB) of 0, and A1 has an LSB of 1, where the LSB is used to select between the first memory block 108 and the second memory block 110. The bits in the virtual addresses other than the LSB are used to generate the physical address. Thus, even virtual addresses are in the first memory block 108 and odd virtual addresses are in the second memory block 110.

The equation for a correlation operation is:

$$y(k) = \sum_{n=0}^{N-1} S(n)R((n+k))_N \qquad (1)$$

where N represents the size of the sequences being correlated, which, for the example illustrated, is eight. For k=0 and n=0, the first multiplication of EQ. 1 will multiply S(0) and R(0). The virtual addresses for S(0) and R(0) are A0 and C0, respectively, which are located in the first memory block 108. These two virtual addresses (A0 and C0) can be modified by toggling their respective LSBs to produce virtual addresses A1 and C1 which may used to address to the second memory block 110 to retrieve S(1) and R(1). According to EQ. 1, S(1) and R(1) are the next two data to be multiplied. As was stated above, A0 and A1 equate to the same physical address in their respective memory blocks and differ only in their LSBs. If the address bits of A0 except the LSB are used to address both memory blocks 108 and 110, both values S0 and S1 can be retrieved, thus achieving the same results as generating virtual address A1 by toggling the LSB of virtual address A0 to produce the addresses needed to retrieve the values. The same applies for virtual addresses C0 and C1. Using this technique, four reads can occur simultaneously from two memory blocks and four sequence values for the correlation computation are retrieved.

Continuing with the example, in the case where k=1 and n=0, the virtual addresses A0 and C1 will be generated to retrieve values S(0) and R(1) for multiplication. It should be apparent that S(0) is in the first memory block 108 and R(1) is in the second memory block 110. The LSB of A0 can be toggled, or the virtual address A0 without the LSB applied to both memory blocks, to retrieve S(1) from location A1 for the second calculation. However, if the LSB of virtual address C1 is toggled or the virtual address is used in both memory blocks disregarding the LSB, address C0 will be produced. Address C0 is not the correct address, and R(0) will be retrieved. What is desired is to retrieve R(2) from location C2 for the subsequent multiplication. Therefore, rather than toggling or disregarding the LSB as before, the address C1 is incremented in a modulo fashion to produce C2.

The requirement for a modulo increment function rather than a standard increment function is emphasized by the case where k=1 and n=6 in the present example. In this case, addresses A6 and C7 will be generated to retrieve S(6) and R(7) for multiplication. The next two data for multiplication are S(7) (at location A7) and R(0) (at location C0). Location A7 is easily generated as explained above, but if a regular increment is used, C8 is generated instead of C0. AGUs in DSPs are designed to support modulo addressing, and this function must also be supported when AGU generated addresses are modified as described.

FIG. 2 illustrates an apparatus 300 which may be used to improve the effective memory access speed in a DSP system. The apparatus 300 includes an AGU 102, a first memory block 308, a second memory block 310, and an address modification block 320. The first memory block 308 and the second memory block 310, which may be blocks within a dual-port random access memory (RAM), store data to be used for calculation in a similar manner to that shown in FIG. 1. The first memory block 308 stores even-indexed first data 340 and even-indexed second data 342, where an even index equates to an even virtual address (LSB=0). The second memory block 310 stores odd indexed-first data 344 and odd-indexed second data 346 (LSB=1).

The AGU, which supports modulo addressing, generates a first address 302 and a second address 304, which may be virtual addresses. The first address 302 generated by the AGU 102 is constrained to always be an even address. A portion of the first address 302, which may include all of the address bits except the LSB, is used to retrieve one of the even-indexed first data 340 from the first memory block 308 for a first calculation. The portion of the first address 302 is also used to retrieve one of the odd-indexed first data 344 from the second memory block 310 for a second calculation. Note that the LSB of the even first address 302 could also be toggled to address the second memory block 310.

The second address 304 is not constrained to be odd or even. In a correlation/convolution operation, the value of k in EQ. 1 will determine an odd or even second address 304. The address modification block 320 is used to modify the second address 304 to retrieve even- and odd-indexed second data 342, 346 from the first and second memory blocks 308, 310, respectively. The address modification block includes an address control block 334, an wrap detect block 322, an incrementing block 328, a modulo block 326, and a memory control block 338.

The address control block 334 receives the second address 304 and produces an even result 335 or an odd result 336 based on at least a portion of the second address 304. In the preferred embodiment, the portion of the second address used to determine an even result 335 or an odd result 336 is the LSB of the second address 304. The incrementing block 328 receives the second address 304 and adds an increment value to the second address to produce an incremented address 330. The wrap detect block 322 receives the second address 304 and adds a buffer length value to the second address to produce a comparison address 324. In the preferred embodiment, the buffer length value is a negative number based on the size of the memory buffer used to store the sequence such that a negative result is produced in a portion of the resulting comparison address 324 if the incremented address 330 is within the limits of the buffer. If a non-negative result occurs, the buffer needs to "wrap" or reset to the first address in the buffer.

The modulo block 326 selects the comparison address 324 or the incremented address 330 based on at least a portion of the comparison address 324 to produce a modified second address 332. If the portion of the comparison address 324 is negative, the incremented address 330 is selected. If the portion of the comparison address 324 is non-negative, the incremented address 330 is selected. The wrap detect block 322, the incrementing block 328, and the modulo block 326 combine to form the equivalent of a modulo incrementor such that the second address is incremented in a modulo fashion to produce the modified second address 332. It should be apparent to one skilled in the art that the modulo increment function may be replaced by a similar modulo decrement function with the assumption that the storage of the sequences in memory is also modified accordingly.

The memory control block 338 addresses the first memory block 308 and the second memory block 310 based on the even result 335 or odd result 336. The first memory block 308 is addressed by the memory control block 338 using an even address 404, and the second memory block 310 is addressed using an odd address 406.

When the address control block 334 produces the even result 335, the memory control block 338 uses a portion of the second address 304 to retrieve one of the even-indexed second data 342 for the first calculation. Simultaneously, the memory control block 338 uses a portion of the modified second address 332 to retrieve one of the odd-indexed second data 346 from the second memory block 310 for the second calculation. In other words, when there is an even result 335, the memory control block 338 passes the portion of the second address 304 to the even address 404 and passes the portion of the modified second address 332 to the odd address 406.

When the address control block 334 produces the odd result 336, the memory control block 338 uses the portion of the modified second address 332 to retrieve one of the even-indexed second data 342 from the first memory block 308 for the second calculation. Simultaneously, the memory control block 338 uses the portion of the second address 304 to retrieve one of the odd-indexed second data 346 from the second memory block 310 for the first calculation. Thus, when there is an odd result 336, the memory control block 338 passes the portion of the modified second address 332 to the even address 404 and passes the portion of the second address 304 to the odd address 406.

The first calculation may be a multiplication of the data fetched by the first and second addresses 302 and 304. Data retrieved for the first calculation by the first address 302 is always even-indexed first data 340 due to the constraints on the first address 302. Data retrieved by the second address 304 for the first calculation may be even-indexed second data 342 or odd-indexed second data 346, as the constraints on the first address 302 are not present on the second address 304. The second calculation may be a multiplication of the odd-indexed first data 344 (the sequence value subsequent to the even-indexed first data 340) and the even-indexed second data 342 or odd-indexed second data 346 based on whether the second address 304 generated by the AGU 102 is even or odd.

In order for four simultaneous memory accesses to occur within the system, the control signals to each of the memory blocks 308, 310 must be modified to allow two reads to occur in each block simultaneously. A typical dual-port RAM normally allows for two output data values, and therefore, in the preferred embodiment, the data values for the first calculation are placed on the outputs first, and the data values for the second calculation may be latched in storage registers until they are to be placed on the outputs.

Figure 3:
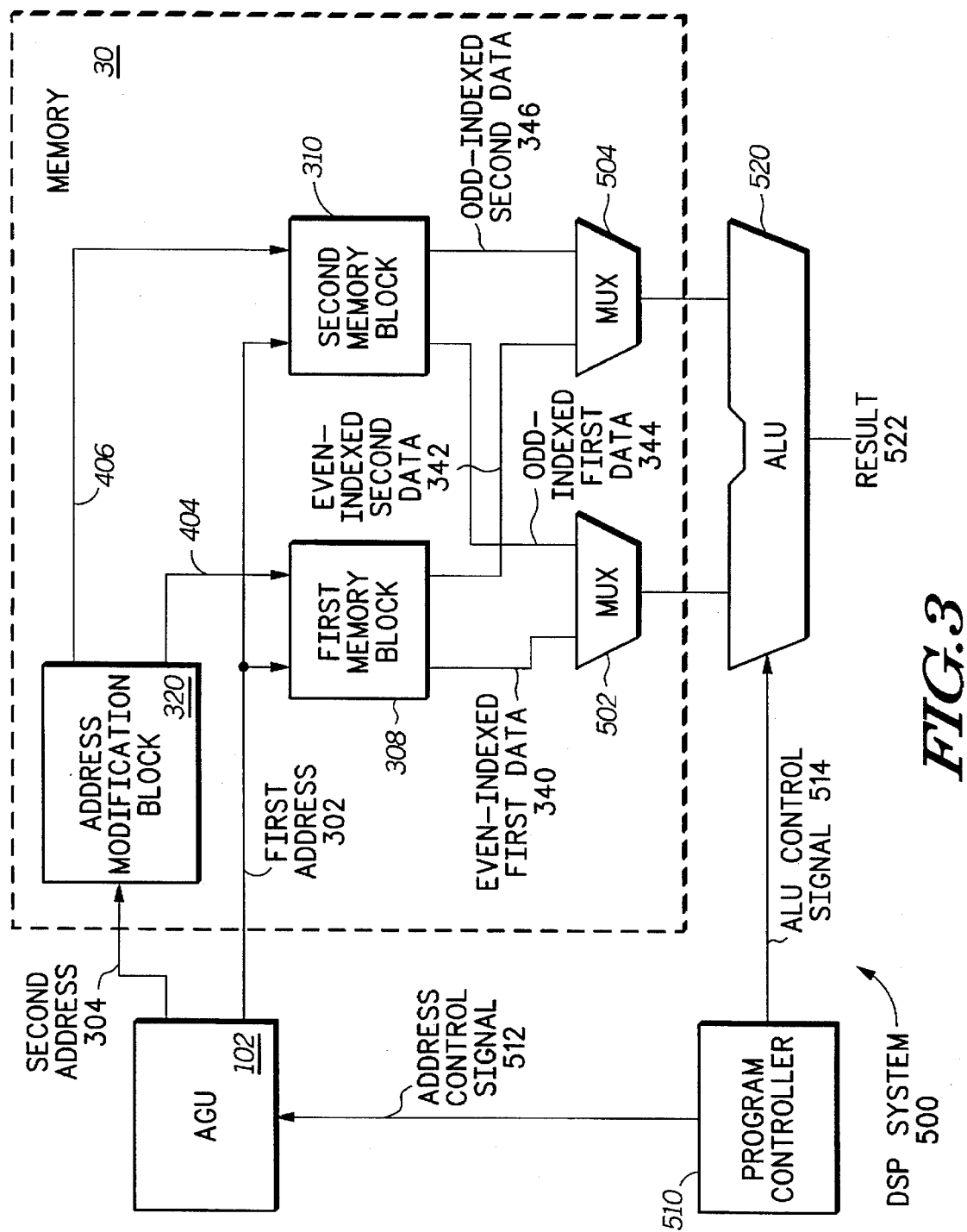
FIG. 3 illustrates, in a block diagram, a digital signal processing system in accordance with the present invention.

FIG. 3 illustrates a DSP system 500 that includes a program controller 510, a first memory block 308, a second memory block 310, an arithmetic logic unit (ALU) 520, an AGU 102, an address modification block 320, and multiplexers (MUXes) 502, 504. The memory blocks 308, 310, the address modification block 320, and the MUXes 502, 504 are grouped together in the memory 30. The operation of the AGU 102, address modification block 320, first memory block 308, and second memory block 310 are described in detail in the discussion of FIG. 2 above. The program controller 510 produces a plurality of control signals to control execution of an algorithm, including address control signal 512, which instructs the AGU to generate addresses, and ALU control signal 514. The ALU 520 performs at least a first calculation and a second calculation on data it receives based on the ALU control signal 514. In the preferred embodiment, the algorithm of the program controller 510 includes correlation/convolution operations, where the multiplication and addition is performed in the ALU 520 to produce a result 522.

The multiplexers 502, 504 control the flow of data to the ALU 520 from the first memory block 308 and the second memory block 310 such that the correct data is available to the ALU 520 for each calculation. In one example, the multiplexers 502, 504 pass the even-indexed first data 340 and the even-indexed second data 342 to the ALU 520 for the first calculation, and pass the odd-indexed first data 344 and the odd-indexed second data 346 to the ALU 520 for the second calculation. In a system where the ALU 520 is able to perform at least two computations during the time needed for a memory access, the ability to retrieve four pieces of data based on two addresses doubles the speed at which calculations can occur by doubling the effective bandwidth of the memory accesses. This speed increase is accomplished without the need to redesign the existing architectural blocks such as the AGU 102, program controller 510, and ALU 520.

Figure 4:
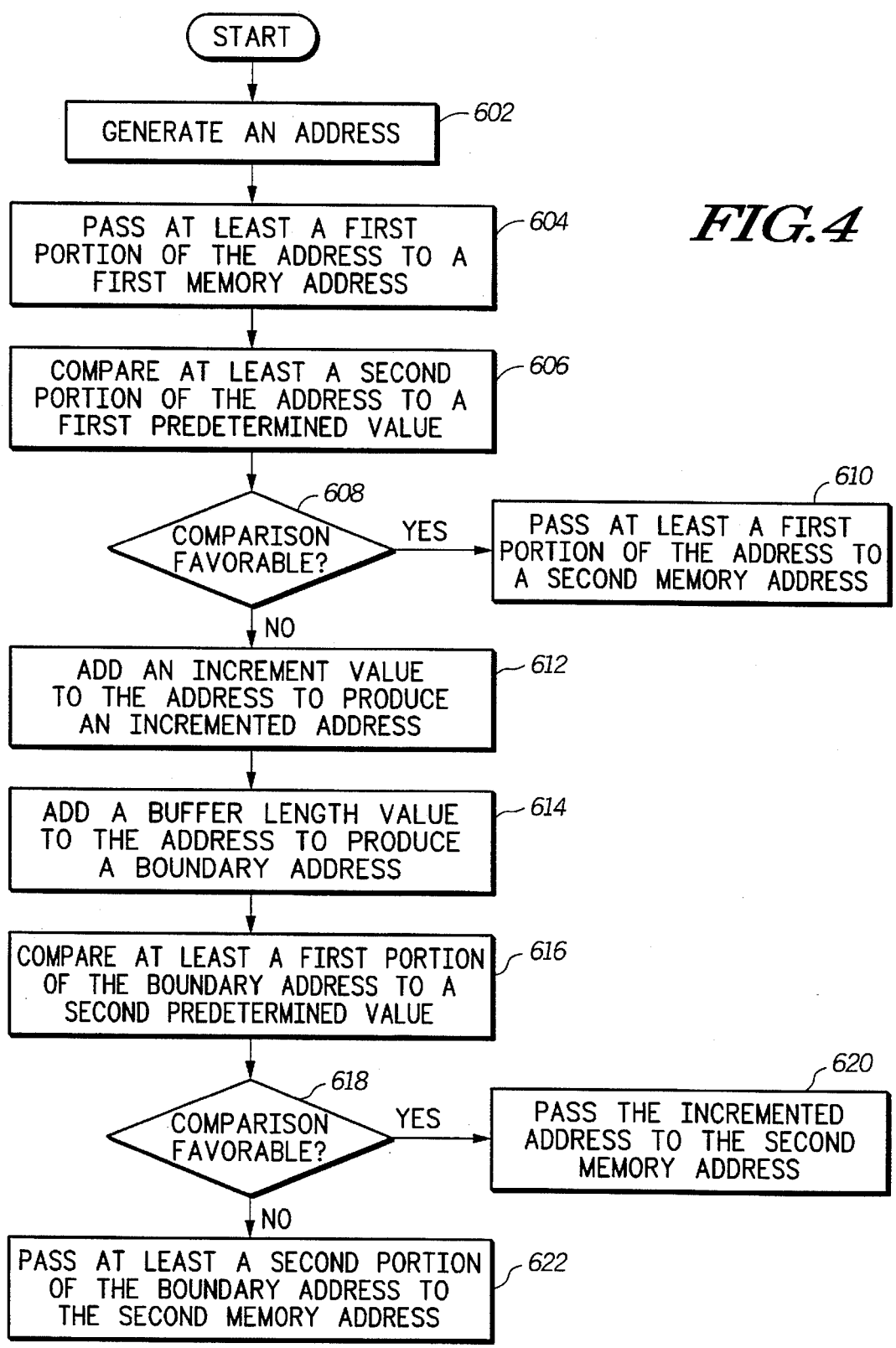
FIG. 4 illustrates, in a flow diagram, a method for generating multiple memory addresses in accordance with the present invention.

FIG. 4 is a flow diagram which illustrates a method for generating multiple memory addresses that may be used in a DSP system to effectively accelerate memory accesses. At step 602, an address is generated. A portion of the address is passed to a first memory address at step 604, where, in the preferred embodiment, the portion is the address except for its LSB. At step 606, another portion of the address is compared to a first predetermined value. In the preferred embodiment, this is a determination as to whether or not the LSB of the address is a one or a zero (i.e. is the address an odd address or an even address). At step 608, it is determined whether or not the comparison is favorable. If the comparison is favorable, the portion of the address that was passed to the first memory address is also passed to a second memory address at step 610. In the preferred embodiment, the comparison at step 606 is an even/odd comparison, and an even result is determined to be a favorable comparison at step 608. In such an embodiment, step 610 passes the same physical address to two memory addresses that may be used to address two parallel memory blocks.

If an unfavorable comparison is determined at step 608, which is an odd address in the preferred embodiment, an increment value is added to the address at step 612 to produce an incremented address. At step 614, a buffer length value is added to the address to produce a boundary address. The buffer length value may be a negative number equal to the size of a buffer used to store a sequence in memory such that a negative number results when the bounds of the buffer are exceeded by the incremented address. In step 616, a portion of the boundary address is compared to a second predetermined value, which may involve determining whether or not a negative number results.

In step 618, it is determined whether or not the comparison is favorable. If the comparison is favorable, which, in the preferred embodiment, equates to the incremented address being within the boundaries of a memory buffer, the incremented address is passed to the second memory address at step 620. If the comparison is unfavorable, another portion of the boundary address is passed to the second memory address at step 622, where the portion of the boundary address represents the beginning of the buffer. Thus, steps 612, 614, 616, 618, 620 and 622 such perform a modulo increment function on the address generated in step 602.

Figure 5:
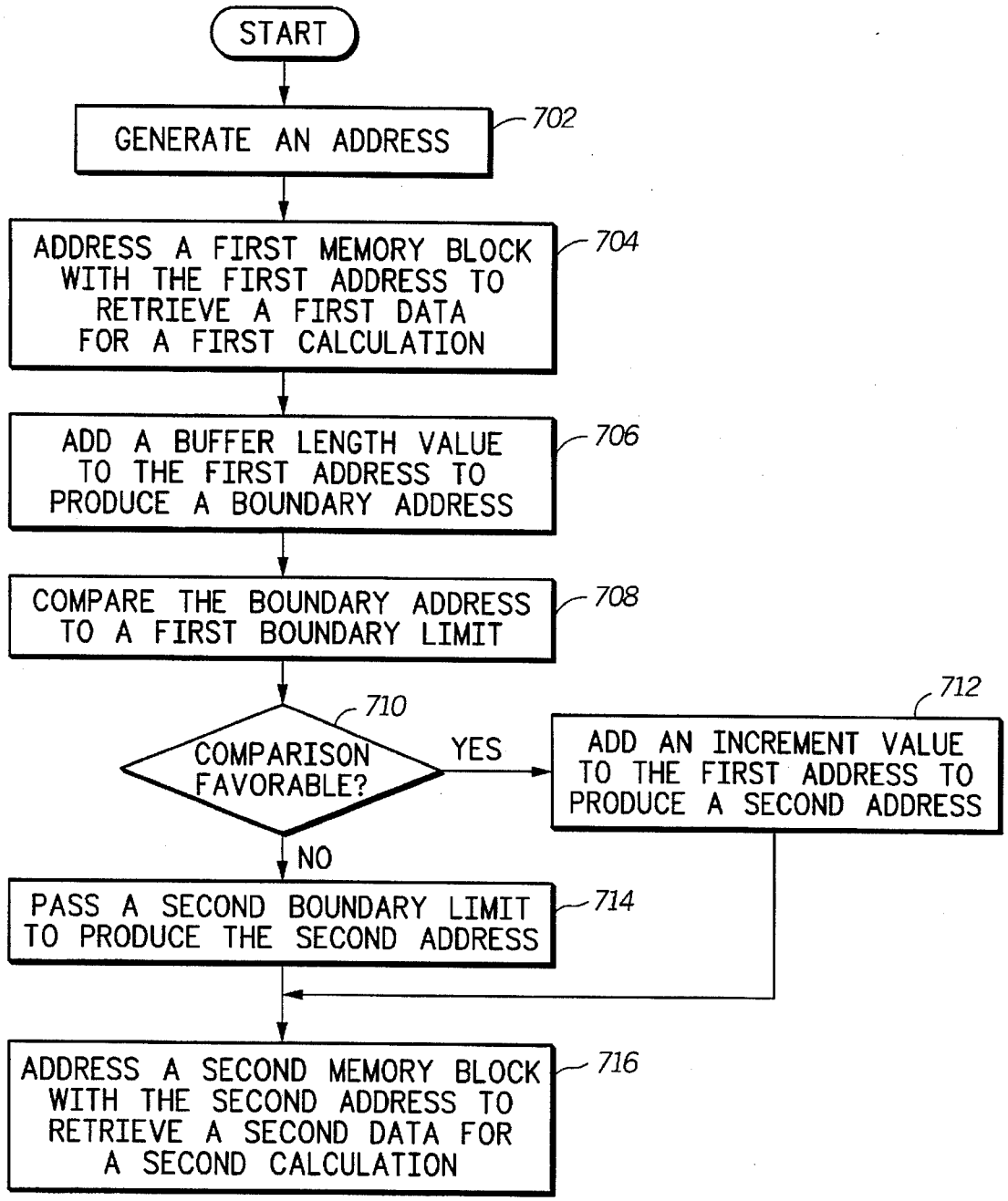
FIG. 5 illustrates, in a flow diagram, a method for retrieving data from memory in accordance with the present invention.

FIG. 5 is a flow diagram which illustrates a method for retrieving data from memory which may be used for memory access acceleration in DSP systems. A first address is generated at step 702. In step 704, the first address is used to address a first memory block to retrieve a first data for a first calculation. At step 706, a buffer length value is added to the first address to produce a boundary address, which is similar to step 614 of FIG. 4. At step 708, the boundary address is compared to a first boundary limit, and at step 710, the comparison is determined to be favorable or unfavorable. Steps 708 and 710 are similar to steps 616 and 618 of FIG. 4, respectively.

If the comparison if determined to be favorable, an increment value is added to the first address to produce a second address at step 712. Note that the determination as to whether or not the incremented address falls within the bounds of the memory buffer has already been determined at this point. In a hardware implementation of the method illustrated, a single adder may be used to perform the operations of steps 706 and 712 in a serial fashion, thus conserving die area.

If the comparison is determined to be unfavorable at step 710, a second boundary limit is passed to produce the second address at step 714. The second boundary limit corresponds to the beginning of the memory buffer such that when the incremented address would exceed the bounds of the buffer, the address is "wrapped" to the beginning. In step 716, a second memory block, which may be part of a single memory that also includes the first memory block, is addressed with the second address to retrieve a second data for a second calculation.

Figure 6:
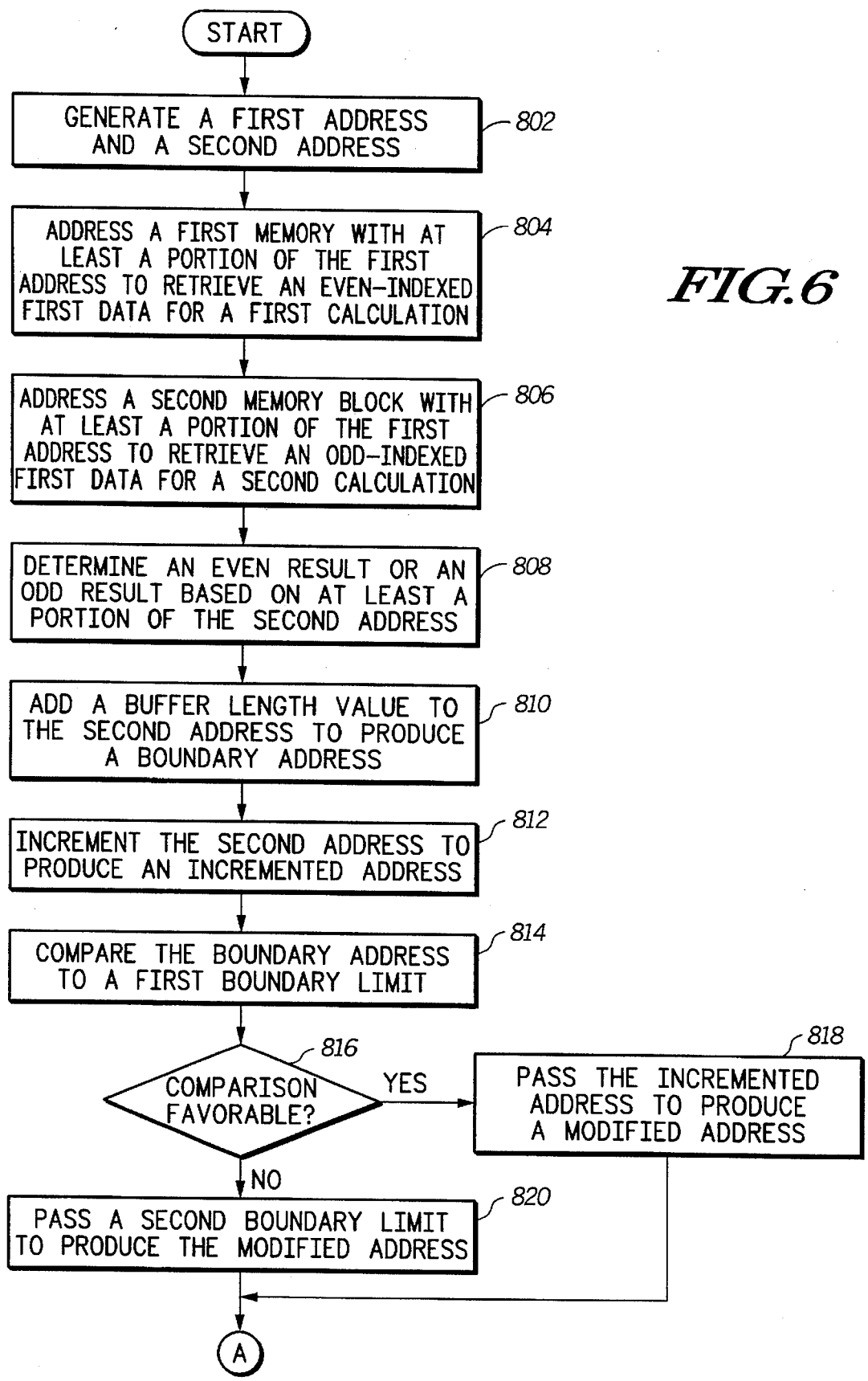
FIGS. 6 and 7 illustrate, in a flow diagram, a method for retrieving data for calculation in accordance with the present invention.
Figure 7:
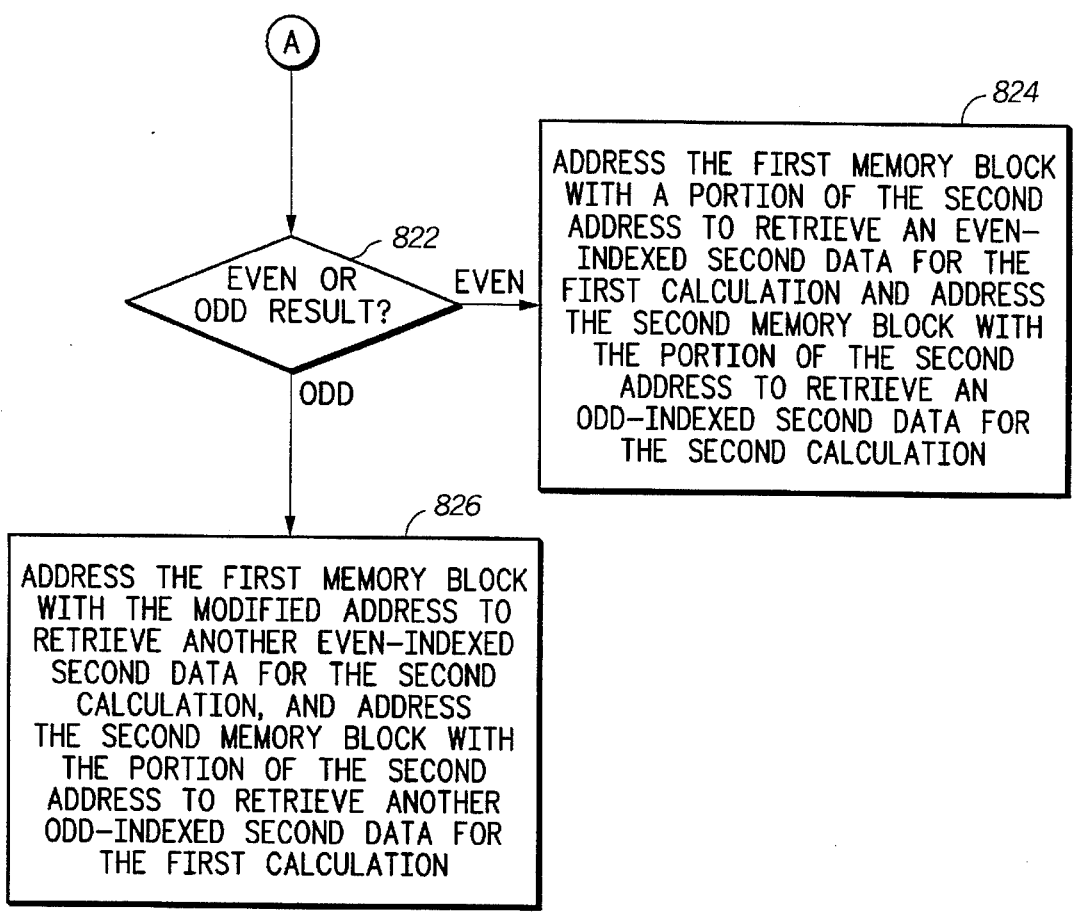

FIGS. 6 and 7 illustrate a method for retrieving data for calculation. In step 802, a first address and a second address are generated. The address generation may be done in an AGU under the control of a program controller as was described in the discussion of FIG. 6. In step 804, a first memory block is addressed with at least a portion of the first address to retrieve an even-indexed first data for a first calculation. At step 806, a second memory block, which may be part of a single memory that also includes the first memory block, is addressed in the same manner as step 804 to retrieve an odd-indexed first data for a second calculation.

In step 808, an even result or an odd result is determined based on at least a portion of the second address, which may be the LSB of the second address. At step 810, a buffer length value is added to the second address to produce a boundary address, which is similar to step 614 of FIG. 4. In step 812, the second address is incremented to produce an incremented address. At step 814, the boundary address is compared to a first boundary limit, which, in the preferred embodiment, determines whether or not the boundary address is a negative number or equal to the beginning address of a memory buffer. At step 816, it is determined whether or not the comparison is favorable. In the preferred embodiment, a favorable comparison indicates a negative boundary address or a boundary address that does not mark the beginning of the memory buffer.

If the comparison is favorable, the incremented address is passed to produce a modified address at step 818. If the comparison is unfavorable, a second boundary limit is passed to produce the modified address at step 820. In the preferred embodiment, the modified address is equal to the beginning of the memory buffer addressed by the second address.

At step 822, it is determined whether an even or an odd result was determined at step 808. At step 824, if an even result was determined, the first memory block is addressed with the modified address to retrieve an even-indexed second data for the first calculation, and the second memory block is addressed in the same manner as the first memory block to retrieve an odd-indexed second data for the second calculation. At step 826, if an odd result was determined, the first memory block is addressed with a portion of the second address to retrieve an even-indexed second data for the first calculation, and the second memory block is addressed with a portion of the second address to retrieve an odd-indexed second data for the second calculation. In the preferred embodiment, the first and second calculations are part of a correlation/convolution operation, but it should be obvious to those skilled in the art that other calculation-intensive operations would also benefit from the method.

The present invention provides a method and apparatus for accelerating memory accesses in a digital signal processor. The speed of prior-art DSP systems was limited by the speed of memory accesses when the instruction execution speed increased. By modifying AGU generated addresses to produce additional addresses and retrieving data from parallel memory blocks simultaneously, effective memory access bandwidth is improved without the need to modify existing program control and AGU blocks or the instruction set.

We claim:

1. An apparatus comprising:
   a first memory block, wherein the first memory block stores even-indexed first data and even-indexed second data;
   a second memory block, wherein the second memory block stores odd-indexed first data and odd-indexed second data;
   an address generation unit, wherein the address generation unit generates a first address and a second address, wherein a portion of the first address is used to retrieve one of the even-indexed first data from the first memory block for a first calculation, and wherein the portion of the first address is used to retrieve one of the odd-indexed first data from the second memory block for a second calculation;
   an address modification block operably coupled to the address generation unit, wherein the address modification block includes:
   an address control block, wherein the address control block receives the second address and produces an even or odd result based on at least a portion of the second address;
   a wrap detect block receiving the second address, wherein the wrap detect block adds a buffer length value to the second address to produce a comparison address;
   an incrementing block receiving the second address, wherein the incrementing block adds an increment value to second address to produce an incremented address;
   a modulo block operably coupled to the wrap detect block and the incrementing block, wherein the modulo block selects the comparison address or the incremented address based on at least a portion of the comparison address to produce a modified second address;
   a memory control block, wherein when the address control block produces the even result, the memory control block uses a portion of the second address to retrieve one of the even-indexed second data from the first memory block for the first calculation and uses a portion of the modified second address to retrieve one of the odd-indexed second data from the second memory block for the second calculation; and
   wherein when the address control block produces the odd result, the memory control block uses the portion of the modified second address to retrieve one of the even-indexed second data from the first memory block for the second calculation and uses the portion of the second address to retrieve one of the odd-indexed second data from the second memory block for the first calculation.

2. The apparatus of claim 1, wherein the first calculation and the second calculation are part of a correlation/convolution operation.

3. An address generation apparatus comprising:
   an address generation unit, wherein the address generation unit generates a first address and a second address;
   an address modification block operably coupled to the address generation unit, wherein the address modification block includes:
   an address control block, wherein the address control block receives the second address and produces an even or odd result based on at least a portion of the second address;
   a wrap detect block receiving the second address, wherein the wrap detect block adds a buffer length value to the second address to produce a comparison address;
   an incrementing block receiving the second address, wherein the incrementing block adds an increment value to second address to produce an incremented address;
   a modulo block operably coupled to the wrap detect block and the incrementing block, wherein the modulo block selects the comparison address or the incremented address based on at least a portion of the comparison address to produce a modified second address;
   an address selection block, wherein when the address control block produces the even result, the address selection block uses a portion of the second address to produce an even address and uses a portion of the modified second address to produce an odd address; and wherein when the control block produces the odd result, the address selection block uses the portion of the modified second address to produce the even address and uses the portion of the second address to produce the odd address.

4. A digital signal processing system, comprising:

a program controller, wherein the program controller produces a plurality of control signals to control execution of an algorithm;

a first memory block, wherein the first memory block stores even-indexed first data and even-indexed second data;

a second memory block, wherein the second memory block stores odd-indexed first data and odd-indexed second data;

an arithmetic logic unit operably coupled to the first memory block, the second memory block, and the program controller, wherein the arithmetic logic unit performs at least a first calculation and a second calculation based on at least one of the plurality of control signals;

an address generation unit operably coupled to the program controller, wherein the address generation generates, based on at least one of the plurality of control signals, a first address and a second address, wherein a portion of the first address is used to retrieve one of the even-indexed first data from the first memory block for the first calculation, and wherein the portion of the first address is used to retrieve one of the odd-indexed first data from the second memory block for the second calculation; and an address modification block operably coupled to the address generation unit, wherein the address modification block includes:

an address control block, wherein the address control block receives the second address and produces an even or odd result based on at least a portion of the second address;

a wrap detect block receiving the second address, wherein the wrap detect block adds a buffer length value to the second address to produce a comparison address;

an incrementing block receiving the second address, wherein the incrementing block adds an increment value to second address to produce an incremented address;

a modulo block operably coupled to the wrap detect block and the incrementing block, wherein the modulo block selects the comparison address or the incremented address based on at least a portion of the comparison address to produce a modified second address;

a memory control block, wherein when the address control block produces the even result, the memory control block uses a portion of the second address to retrieve one of the even-indexed second data from the first memory block for the first calculation and uses a portion of the modified second address to retrieve one of the odd-indexed second data from the second memory block for the second calculation; and wherein when the address control block produces the odd result, the memory control block uses the portion of the modified second address to retrieve one of the even-indexed second data from the first memory block for the second calculation and uses the portion of the second address to retrieve one of the odd-indexed second data from the second memory block for the first calculation.

5. The digital signal processing system of claim 4, wherein the first calculation and the second calculation are part of a correlation/convolution operation.

6. A method for retrieving data for calculation, the method comprising:

generating a first address and a second address;

addressing a first memory block with at least a portion of the first address to retrieve an even-indexed first data for a first calculation;

addressing a second memory block with the at least a portion of the first address to retrieve an odd-indexed first data for a second calculation;

determining an even result or an odd result based on at least a portion of the second address;

adding a buffer length value to the second address to produce a boundary address;

incrementing the second address to produce an incremented address;

comparing the boundary address to a first boundary limit;

when the boundary address compares favorably with the first boundary limit, passing the incremented address to produce a modified address;

when the boundary address compares unfavorably with the first boundary limit, passing a second boundary limit to produce the modified address;

when the even result is determined, addressing the first memory block with a portion of the second address to retrieve an even-indexed second data for the first calculation, and addressing the second memory block with the portion of the second address to retrieve an odd-indexed second data for the second calculation; and when the odd result is determined, addressing the first memory block with the modified address to retrieve another even-indexed second data for the second calculation, and addressing the second memory block with the portion of the second address to retrieve another odd-indexed second data for the first calculation.

7. A digital signal process system, comprising:

a first memory having a first data block containing a plurality of data and a second data block containing a plurality of data;

a second memory having a first data block containing a plurality of data and a second data block containing a plurality of data;

an address generation unit (AGU) having a first address coupled to the first memory and a second address, wherein the first address for providing a first address value for accessing a one of the plurality of data in the first data block of the first memory, and a one of the plurality of data in the first data block of the second memory;

an address modification block coupled to the second address, and having a first memory address coupled to the first memory, and a second memory address coupled to the second memory, wherein the second address for providing a second address value; and when the second address value is even, a portion of the second address value is used to access a one of the plurality of data in the second data block of the first memory, and a modified second address value accesses a one of the plurality of data in the second data block of the second memory, where the second address value is incremented to provide the modified address value; and when the second address value is odd, a portion of the second address value is used to access a one of the plurality of data in the second data block of the second memory, and a modified second address value accesses a one of the plurality of data in the second data block of the first memory, where the second address value is incremented in a modulo manner to provide the modified address value; and wherein the one of the plurality of data in the first data block of the first memory, the one of the plurality of data in the second data block of the first memory, the one of the plurality of data in the first data block of the second memory, and the one of the plurality of data in the second data block of the second memory are accessed approximately simultaneously.

* * * * *